US009862501B2

(12) United States Patent
Small et al.

(10) Patent No.: US 9,862,501 B2
(45) Date of Patent: Jan. 9, 2018

(54) METHOD AND SYSTEMS FOR INTEGRATED GLOBAL VIEW OF OPERATIONS

(71) Applicant: The Boeing Company, Huntington Beach, CA (US)

(72) Inventors: Gregory John Small, Federal Way, WA (US); James Lee Cantrell, Jr., Federal Way, WA (US); Mark Hester, Renton, WA (US); David Wendell Thompson, Burien, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/674,386

(22) Filed: Mar. 31, 2015

(65) Prior Publication Data
US 2016/0288920 A1 Oct. 6, 2016

(51) Int. Cl.
G08B 21/00 (2006.01)
B64D 45/00 (2006.01)
G06Q 10/00 (2012.01)

(52) U.S. Cl.
CPC ............. *B64D 45/00* (2013.01); *G06Q 10/00* (2013.01)

(58) Field of Classification Search
CPC ...... G08G 5/0021; G08G 5/065; G08G 5/025; G08G 5/0082; G08G 5/0091; B64D 47/06
USPC ........................................................ 340/945
See application file for complete search history.

(56) References Cited

U.S. PATENT DOCUMENTS

| 7,747,382 | B2 | 6/2010 | Small et al. |
| 7,813,871 | B2 | 10/2010 | Small et al. |
| 8,798,899 | B2 | 8/2014 | Aragones et al. |
| 9,218,742 | B2* | 12/2015 | Barry .................. G08G 5/0026 |
| 2002/0049535 | A1 | 4/2002 | Rigo et al. |
| 2008/0010004 | A1 | 1/2008 | Small et al. |
| 2008/0010107 | A1 | 1/2008 | Small et al. |
| 2008/0109160 | A1* | 5/2008 | Sacle ..................... G08G 5/065 |
| | | | 701/33.4 |
| 2009/0051570 | A1* | 2/2009 | Clark ................... G08G 5/0078 |
| | | | 340/971 |
| 2009/0187449 | A1 | 7/2009 | Van Tulder et al. |
| 2011/0144897 | A1* | 6/2011 | Dunsky ................... G08G 5/00 |
| | | | 701/122 |

(Continued)

FOREIGN PATENT DOCUMENTS

| WO | 2008063238 A2 | 5/2008 |
| WO | 2009094243 A1 | 7/2009 |

OTHER PUBLICATIONS

Extended EPO Search Report for related application 15196812.0 dated Jan. 19, 2016; 7 pp.

*Primary Examiner* — Don N Vo
(74) *Attorney, Agent, or Firm* — Armstrong Teasdale LLP (57) ABSTRACT

A computer-implemented method for providing a real-time global view of airline operations situational awareness is provided. The method is implemented using a situational awareness server system in communication with client systems and data sources. The method includes gathering a plurality of situational awareness data from a plurality of data sources including real-time data, updating the situational awareness data based on one or more business rules, augmenting the updated situational awareness data based on historical data, and determining whether to generate one or more alerts based on the augmented situational awareness data.

20 Claims, 8 Drawing Sheets (56) References Cited

U.S. PATENT DOCUMENTS

| | | | |
|---|---|---|---|
| 2012/0218127 A1* | 8/2012 | Kroen | G01W 1/02 |
| | | | 340/945 |
| 2012/0296690 A1 | 11/2012 | Varvarezos et al. | |
| 2013/0138333 A1 | 5/2013 | Aragones et al. | |
| 2013/0245860 A1* | 9/2013 | Cooper | B64D 45/00 |
| | | | 701/14 |
| 2014/0033120 A1 | 1/2014 | Bental et al. | |

* cited by examiner

METHOD AND SYSTEMS FOR INTEGRATED GLOBAL VIEW OF OPERATIONS

BACKGROUND

The field of the present disclosure relates generally to viewing airline information and, more specifically, to providing a global view of airline operations.

Enterprises, such as airlines, need to know the location of their aircraft and the status of individual aircraft it a fleet, on the ground and in the air. Therefore, there is a need to have accurate real-time situational awareness of all aspects of the airline operations in any part of the world, to be able to make accurate and informed decisions. Situational awareness refers to an internalized mental model of the current state of the flight environment, and forms an integrated "picture" that is the central organizing feature from which all decision making and action occurs. Needed information may include the location of each aircraft, the flight schedule for each aircraft, and the maintenance schedule for each aircraft. Other desired information may include details about each airport location for each aircraft, such as the airport's maintenance capabilities or proximity to aircraft, for example, in the case of an emergency situation.

Currently, airlines may only be able to determine this and other needed information piecemeal from the large amounts of data available. Therefore, an operator has to access multiple systems to gain situational awareness in real-time or near real-time environments. Additionally, some information currently may only available through human interaction, such as calling an airline agent at a gate at an airport, to determine if a fuel truck is parked next to the aircraft. Improving aircraft situational awareness will allow for informed and rapid decision-making to maintain or reestablish normal airline operations.

SUMMARY

In one aspect, a computer-implemented method for providing a real-time global view of airline operations situational awareness is provided. The method is implemented using a situational awareness server system in communication with client systems and data sources. The method includes gathering a plurality of situational awareness data from a plurality of data sources including real-time data about flights, aircraft, and airports, updating by the situational awareness server system the situational awareness data based on one or more business rules, augmenting by the updated situational awareness server system the situational awareness data based on historical data, and determining whether to generate one or more alerts based on the augmented situational awareness data. The alerts are based on a schedule disruption. The method also includes transmitting the one or more alerts to a disruption recovery computer device.

In another aspect, a situational awareness system used to provide a real-time global view of airline operations is provided. The situational awareness server system includes a processor coupled to a memory device. The processor is programmed to gather a plurality of situational awareness data from a plurality of data sources including real-time data about flights, aircraft, and airports, update the situational awareness data based on one or more business rules, augment the updated situational awareness data based on historical data, and determine whether to generate one or more alerts based on the augmented situational awareness data. The alerts are based on a schedule disruption. The processor is also programmed to transmit the one or more alerts to a disruption recovery computer device.

In yet another aspect, a non-transitory computer-readable storage media having computer-executable instructions embodied thereon is provided. When executed by at least one processor, the computer-executable instructions cause the at least one processor to gather a plurality of situational awareness data from a plurality of data sources including real-time data about flights, aircraft, and airports, update the situational awareness data based on one or more business rules, augment the situational awareness data based on historical data, interpret alerts based on current and historical data, receive a user profile including a user role associated with a user from a client system, determine a subset of the updated situational awareness data associated with the user profile based on the user role, and transmit the determined subset of the updated situational awareness data to the client system. The client system displays the subset of the updated situational awareness data to the user.

DETAILED DESCRIPTION

The implementations described herein relate to systems and methods for providing situational awareness of airline operations. More specifically, a situational awareness server system receives real-time data about flights, airports and aircraft from a plurality of data sources. The situational awareness server system collates real-time data to generate a complete picture of the airline as situational awareness data. The situational awareness server system correlates the situational awareness data with business rules and historical data, and then determines if there are any potential or actual schedule impacts to create alerts for users. If the situational awareness server system detects an alert, the situational awareness server system includes the alert with situational awareness data presented to the users and transmits the alert to disruption recovery. In some embodiments, disruption recovery may be a department of the airline; while in other embodiments, disruption recovery may be an advanced computer system. The situational awareness server system filters the situational awareness data based on user input so that responsive data is shown to the user. The situational awareness server system displays the situational awareness data to the user in a plurality of views that allow the user to look at a global view of airline operations, i.e. worldwide, as well as "drill down" to view selected data for individual aircraft at various locations, specific airports, and locations with airports. As such, this overview, combined with drill down capability, allows the user to efficiently access data to maintain or reestablish normal operation of a fleet of aircraft.

Described herein are computer systems such as situational awareness server system and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer system referred to herein may also refer to one or more memories wherein the memories may be in one computing system or a plurality of computing systems acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium, hereafter referred to as a system. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of proximity in time to one of the occurrence of associated events, the time of measurement and collection of predetermined data, the time to process the data, and the time of a system response to the events and the environment. These activities and events may occur substantially instantaneously.

The systems and processes are not limited to the specific embodiments described herein. In addition, components of each system and each process can be practiced independently and separate from other components and processes described herein. Each component and process also can be used in combination with other assembly packages and processes.

Figure 1:
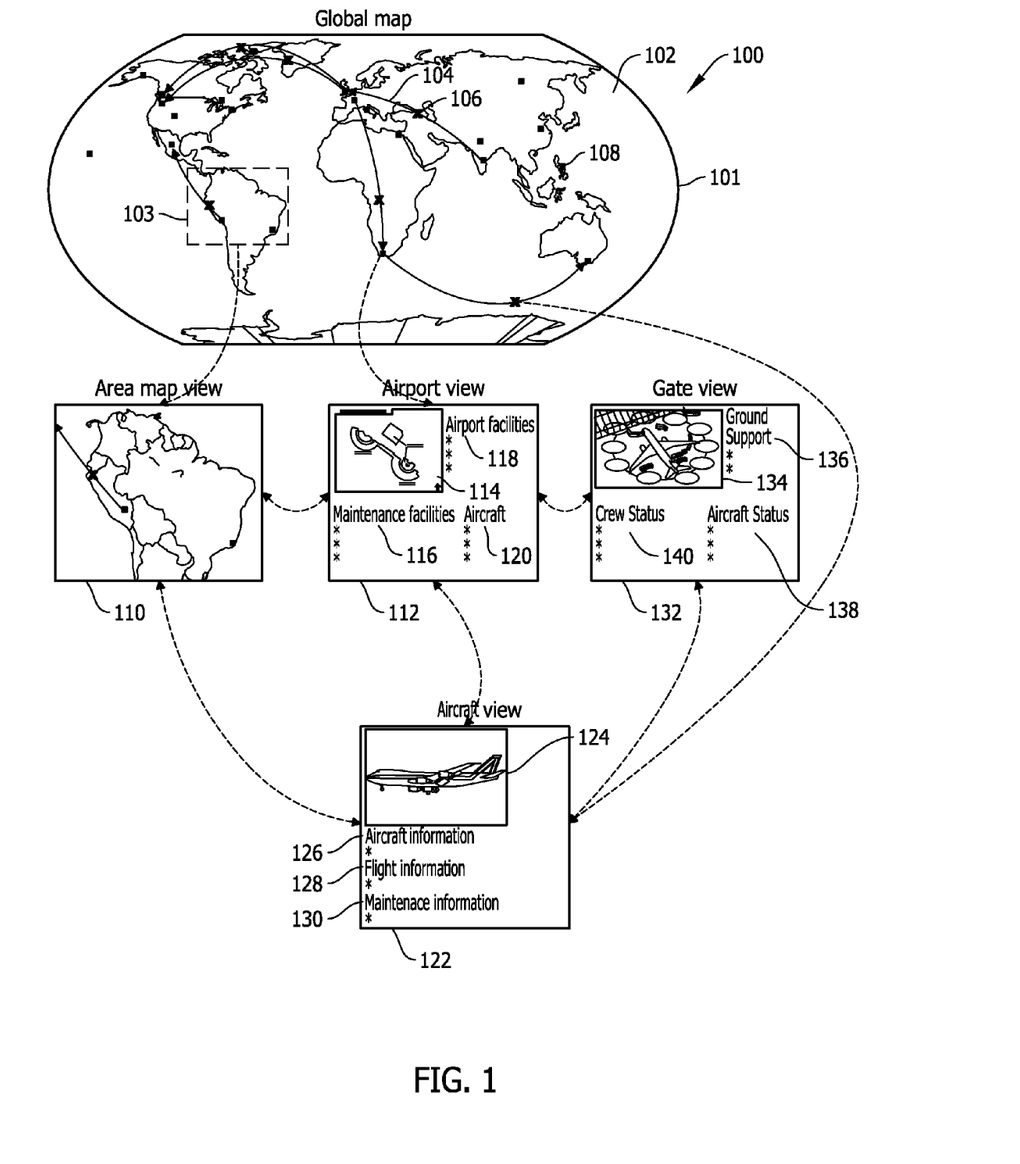
FIG. 1 is an example set of user interfaces for displaying situational awareness of an airline including a global view and series of drilled down views.

FIG. 1 is an example set of user interfaces 100 for displaying situational awareness of an airline including a global view 101 and series of drilled down views. User interfaces 100 include global view 101 of a global map 102 to display a global overview of situational awareness of an airline on global map 102. Global view 101 displays active flight routes 104, real-time positions of aircraft 106 (also known as aircraft) on active flight routes 104, and airports of interest 108. In the example embodiment, active flight routes 104 are based on filed flight plans. In the example embodiment, real-time positions of aircraft 106 are based on information from aircraft, for example ADS-B transmissions, or independent sources, for example from ground radar or from satellite tracking.

User interface 100 also provides other views of items of interest; these additional views include an area map view 110, an airport view 112, an aircraft view 122, and a gate view 132. Area map view 110 is a zoom in area view of global map 102, which displays flight route 104, aircraft 106, and airports 108 within a zoom in map area 103 of the global map 102. In some embodiments, global view 101 is divided up into a plurality of predetermined map areas 103. In other embodiments, the user can select a map area 103 in global map 102, for example by zooming into a selected area on global map 102, to open in area map view 110.

Airport view 112 opens when a user selects an airport 108 from one of the other views. Airport view 112 displays information about the selected airport 108, including a map of airport 114, maintenance facilities 116, airport facilities 118, and a list of aircraft 120 that are currently at airport 108. Maintenance facilities 116 may include a list of all hangars at airport 108 and whether each is open or closed. Airport facilities 118 may include details about jetways at airport 108, any NOTAMs (Notice to Airmen) related to airport 108, a listing of gates and whether each is available or occupied, current security checkpoint wait time, and if there is an international aircraft customs area at airport 108. List of aircraft 120 may include a list of aircraft 106 on the ground at airport 108, for example, those aircraft 106 that need to clear international customs, and those aircraft 106 that have cleared international customs.

Aircraft view 122 opens when a user selects an aircraft 106 from one of the other views. Aircraft view 122 displays aircraft-specific information for the selected aircraft 106, including an image 124 of aircraft 106, aircraft information 126, flight information 128, and aircraft maintenance information 130. Aircraft information 126 may include tail number, major and minor model, total number of seats, number of seats in each section, and current location of aircraft 106. Flight information 128 may include departure and destination airports, countries being overflown, predicted ETA, and scheduled ETA for aircraft 106. Maintenance information 130 includes current outstanding MEL (Minimum Equipment List) items, next scheduled maintenance for aircraft 106 including type, date, and location, maximum number hours before maintenance is required, and maximum number landings before maintenance is required.

Gate view 132 provides airport gate-specific information for the selected gate, including a current image 134 of an aircraft 106 at the gate, ground support 136, real-time aircraft status 138, and real-time crew status 140. Ground support 136 may include information about catering, fuel, water, and baggage services, and the current status for each (e.g., at the gate, not at the gate). Aircraft status 138 may include maintenance activity (i.e., none or scheduled completion time), a list of outstanding MEL (Minimum Equipment List) items, and the amount of fuel onboard. Crew status 140 may include information for each crewmember assigned to the next flight such as current location of each crew member (e.g. at airport or on another flight), whether each crew member is currently legal permitted ("legal") to fly, and the number of hours before a crewmember is not permitted ("illegal") to fly.

The different views are interconnected so that a user may only see desired information by selecting items on the user's current view. From the global view 101, user interface 100 allows a user to select a map area 103, an aircraft 106, or an airport 108 to open area map view 110, aircraft view 122, and airport view 112, respectively. From the map area view 110, a user may select a smaller map area, an aircraft 106, or an airport 108 shown in the displayed area map view 110 to open the area map view 110, aircraft view 122, and airport view 112, respectively.

In airport view 112, the user may select the associated map area 103 to view the area around the airport 108. The user may also select one gate of the selected airport 108 to access gate view 132. The user may also select one aircraft 106 in list of aircraft 120 to access aircraft view 122 for that aircraft 106. The user may also select the global view 101.

In aircraft view 122, the user may select the associated map area 103 to view area map view 110 of the area around the selected aircraft 106. Additionally in aircraft view 122, the user may select the most recently departed airport 108, the destination airport 108, or the airport at which the selected aircraft is currently at 108 to access airport view 112 for that airport 108. Additionally, the user may access gate view 132 from aircraft view 122 if a gate associated with the selected aircraft 106 is shown. The user may also select the global view 101.

In gate view 132, the user may access aircraft view 122 for aircraft 106 at the gate. The user may also select airport view 112 for airport 108 associate with the gate.

Through this plurality of views a user is able to access information about the current status of flights, airports, aircraft and the airline as a whole. The user gains an overview of the current operations of the airline, while being able to drill down for details information as necessary.

Figure 2:
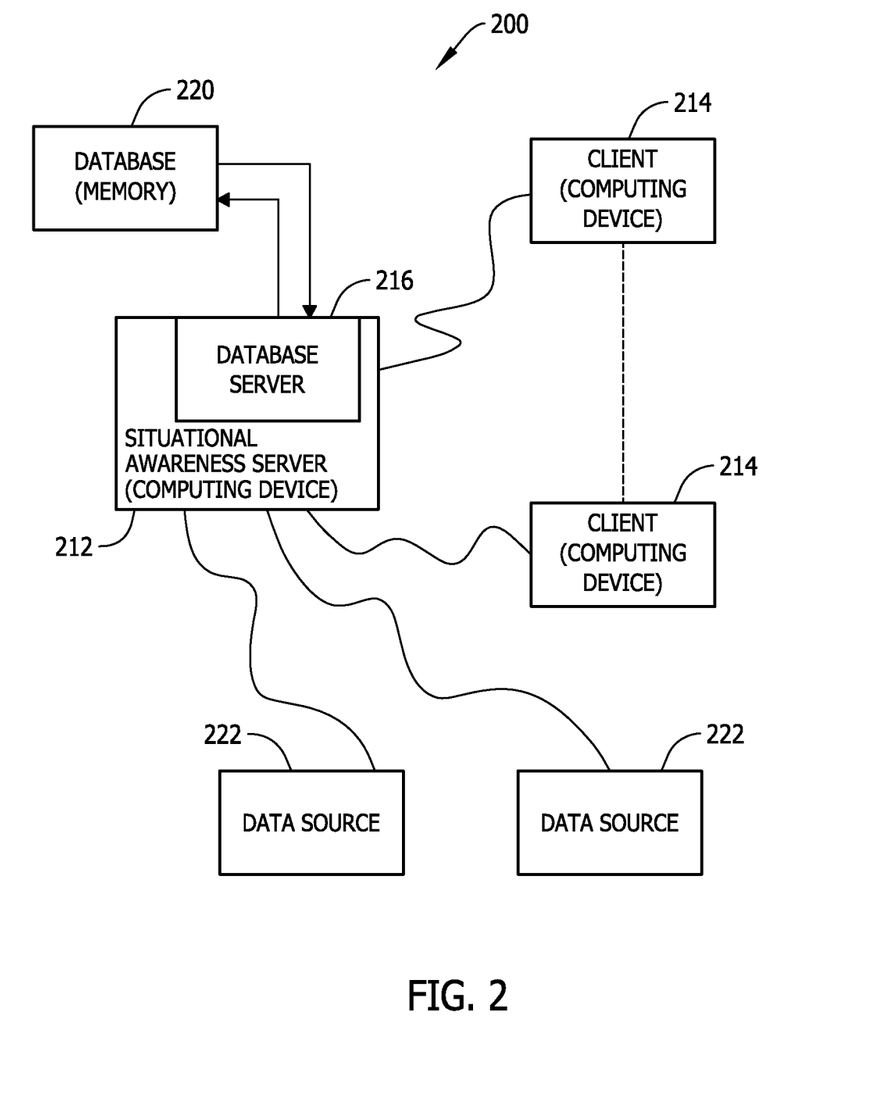
FIG. 2 is a simplified block diagram of a system for providing situational awareness of airline operations in accordance with one embodiment of the present disclosure.

FIG. 2 is a simplified block diagram of a system for providing situational awareness of airline operations in accordance with one embodiment of the present disclosure. System 200 includes a situational awareness server system 212 configured to provide real-time information about flights 104, aircraft 106 and airports 108 (shown in FIG. 1) to a user to improve the user's situational awareness. As described below in more detail, situational awareness server system 212 is configured to receive a plurality of current data from a plurality of data sources 222 including real-time data about flights 104, aircraft 106 and airports 108, generate situational awareness data from the plurality of current data, update the situational awareness data based on one or more business rules, receive from a client system 214 (also known as a client computing device) a user profile including a user role associated with a user, determine a sub-set of the updated situational awareness data associated with the user profile based on the user role, and transmit to client system 214 the determined sub-set of information, wherein client system 214 is configured to display the subset of information to the user.

In the example embodiment, client systems 214 are computers that include a web browser or a software application, which enables client systems 214 to access situational awareness server system 212 using the Internet or other computer network. More specifically, client systems 214 are communicatively coupled to the Internet or other computer network through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client systems 214 can be on any device capable of communicating with the situational awareness server system 212 including, but not limited to, a desktop computer, a laptop computer, a personal digital assistant (PDA), a cellular phone, a smartphone, a tablet, a phablet, or other web-based connectable equipment.

A database server 216 is communicatively coupled to a database 220 that stores data. In one embodiment, database 220 includes situational awareness data, user profiles, business rules, and historical data. Business rules may include, for example, user-defined tasks required to be performed on aircraft 106 from landing to take-off, how many remaining hours each cabin crew member is permitted to be on duty, aircraft regulations, and airline regulations. Historical information may include, for example, past routes for each aircraft, turn around times at each airport, past alerts, and past issues with each aircraft and airport. In the example embodiment, database 220 is stored remotely from situational awareness server system 212. In some embodiments, database 220 is decentralized. In the example embodiment, a person can access database 220 information via client systems 214 by logging onto situational awareness server system 212, as described herein.

One or more data sources 222 are communicatively coupled with situational awareness server system 212. As described in detail below, the one or more data sources 222 provide information in substantially real-time about the flights 104, aircraft 106, and airports 108 that system 200 is monitoring. Data sources 222 include any method or device that may provide up-to-date information to situational awareness server system 212. Data sources 222 may be land based or air based sources. Examples of data sources 222 may include, but are not limited to, automated flight information from aircraft 106, information entered by an agent at the gate, electronic check-ins from maintenance workers or ground crew, cameras viewing individual gates, and any other source of information that provides information to situational awareness server system 212 that allows it to operate as described.

Figure 3:
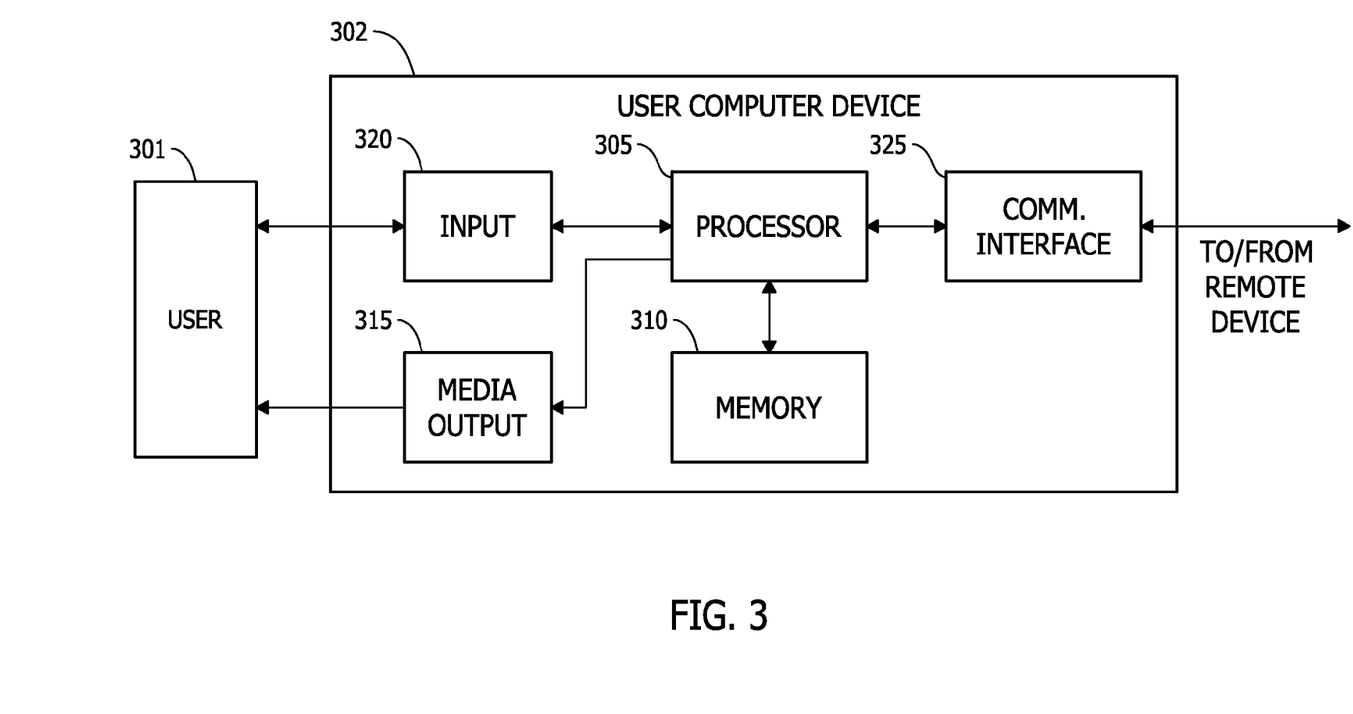
FIG. 3 illustrates an example configuration of a client system shown in FIG. 2, in accordance with one embodiment of the present disclosure.

FIG. 3 illustrates an example configuration of client system 214 shown in FIG. 2, in accordance with one embodiment of the present disclosure. The user computer device 302 is operated by a user 301. User 301 interacts with the user computer device 302 through input 320 and media output 315. Input 320 is provided to processor 305 for executing instructions. User computer device 302 may include, but is not limited to, client systems 214 and data sources 222 (both shown in FIG. 2). User computer device 302 includes a processor 305 for executing instructions. In some embodiments, executable instructions are stored in a memory 310. Memory 310 is any device allowing information such as executable instructions and/or transaction data to be stored and retrieved. Memory 310 may include one or more computer readable media. Processor 305 may use a communication interface 325 communicatively coupled to a remote device such as situational awareness server system 212 (shown in FIG. 2). Communication interface 325 may include, for example, a wired or wireless network adapter and/or a wireless data transceiver for use with a mobile telecommunications network. Processor 305 may provide information to user 301 through at least one media output 315.

Input 320 receives input from user 301. User 301 may use input 320 to, without limitation, select and/or enter one or more items to provide additional situational awareness information. Input 320 may include, for example, a keyboard, a pointing device, a mouse, a stylus, a touch sensitive panel (e.g., a touch pad or a touch screen), an accelerometer, a position detector, a biometric input device, and/or an audio input device. Input 320 may occur through a user interface. A user interface may include, among other possibilities, a web browser and/or a client application. Web browsers enable users, such as user 301, to display and interact with media and other information typically embedded on a web page or a website. A client application allows user 301 to interact with, for example, situational awareness server system 212. An input device 320 may also function as an output device of media output 315.

Figure 8:
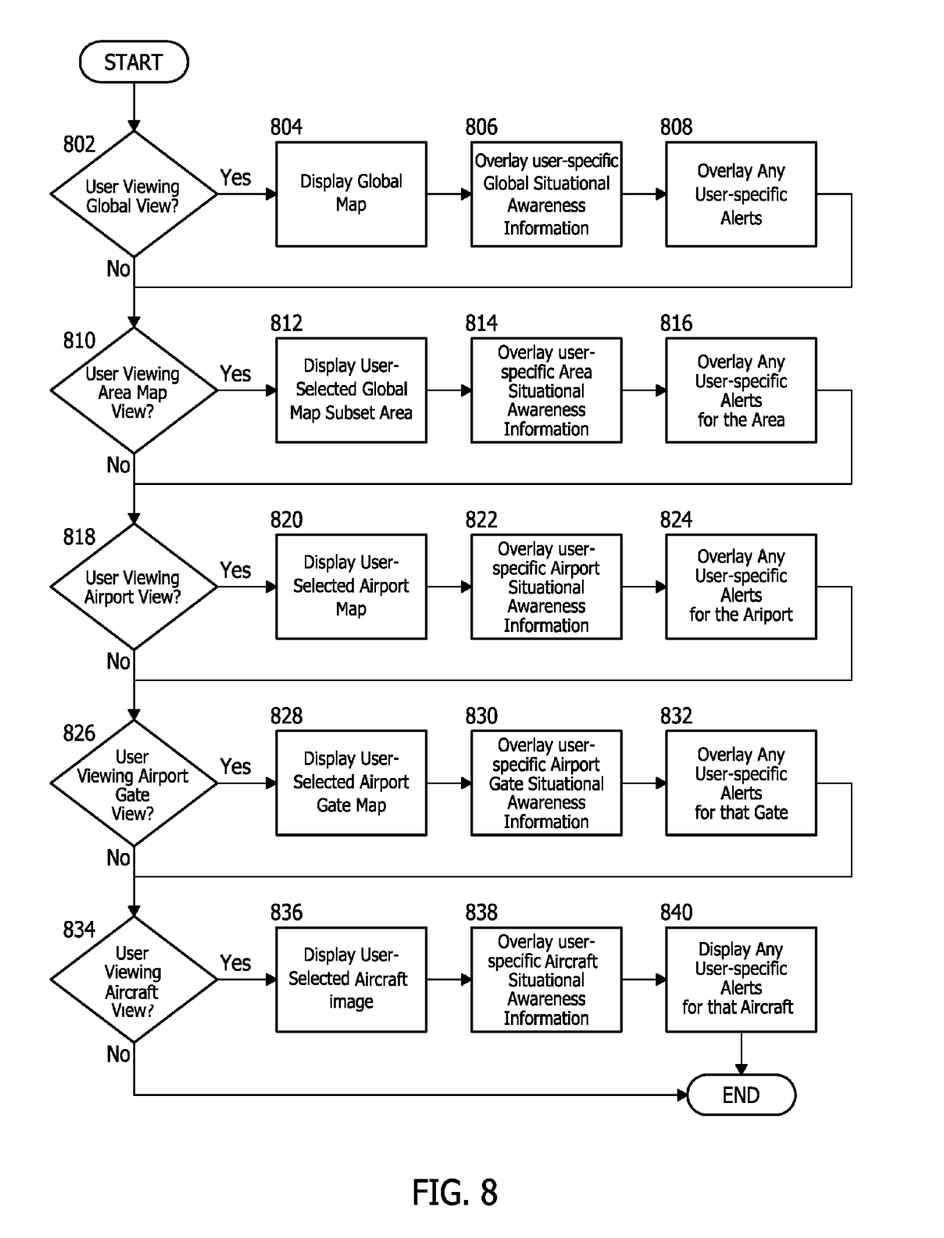
FIG. 8 is a flow chart of a process for displaying the user specific situational awareness data sets as is shown in FIG. 5.

Processor 305 executes computer-executable instructions for implementing aspects of the disclosure. Processor 305 may include one or more processing units (e.g., in a multi-core configuration). In some embodiments, the processor 305 is transformed into a special purpose microprocessor by executing computer-executable instructions or by otherwise being programmed. For example, the processor 305 may be programmed with instructions such as illustrated in FIG. 8.

Stored in memory 310 are, for example, computer readable instructions used by processor 305 for providing a user interface to user 301 via media output 315 and, optionally, receiving and processing input 320. For example, at least one of memory 310 and processor 305 may be stored by a cloud service.

Media output 315 is any component capable of conveying information from processor 305 to user 301. In some embodiments, media output 315 includes an output adapter (not shown) such as a video adapter and/or an audio adapter. The output adapter is operatively coupled to processor 305 and operatively coupled to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output 315 is configured to present a graphical user interface (e.g., a web browser and/or a client application) to user 301. A graphical user interface may include, for example, a global map with current flight, aircraft and airport information, or an image of an aircraft with current situational information on the aircraft with its flight and maintenance items. Media output 315 may also function as an input device 320.

Figure 4:
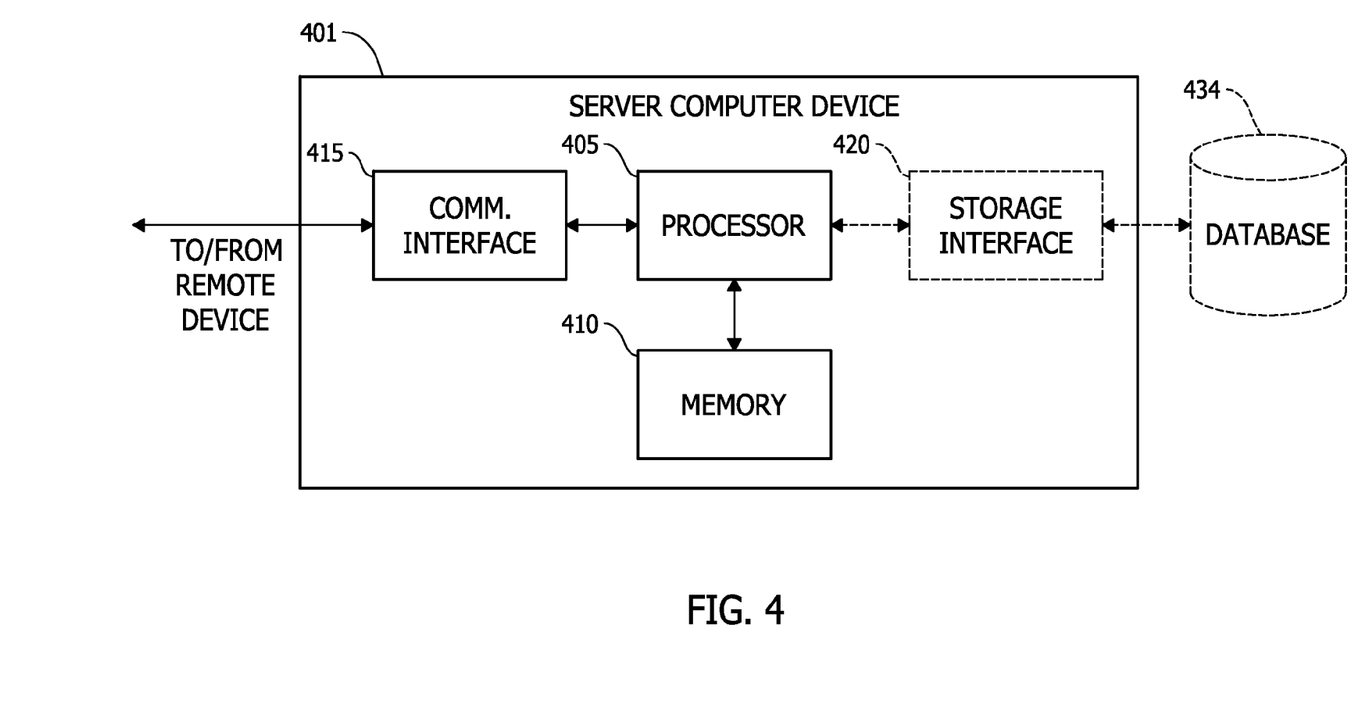
FIG. 4 illustrates an example configuration of a server system shown in FIG. 2, in accordance with one embodiment of the present disclosure.

FIG. 4 illustrates an example configuration of situational awareness server system 212 shown in FIG. 2, in accordance with one embodiment of the present disclosure. Server system 401 may include, but is not limited to, situational awareness server system 212 and database server 216 (shown in FIG. 2). Server system 401 also includes a comm. interface 415 for interacting with client systems (shown in FIG. 2), processor 405 for executing instructions that may include one or more processing units (e.g., in a multi-core configuration), memory 410 for computer readable instructions, and storage interface 420 for communicating with database 434.

Communication interface 415 is capable of communicating with a remote device such as another server system 401, client systems 214, and data sources 222 (all shown in FIG. 2). For example, communication interface 415 may receive requests from client systems 214 (shown in FIG. 2) through communications interface 325 (shown in FIG. 3), and may receive data from data sources (shown in FIG. 2).

Processor 405 executes computer-executable instructions for implementing aspects of the disclosure. In some embodiments, the processor 405 is transformed into a special purpose microprocessor by executing computer-executable instructions or by otherwise being programmed. For example, the processor 405 is programmed with instructions such as illustrated in FIGS. 5-8. Processor 405 may also be operatively coupled to memory 410. Processor 405 may also be operatively coupled to database 434. In some embodiments, processor 405 is operatively coupled to database 434 via a storage interface 420.

Memory 410 is any device allowing information such as executable instructions and/or transaction data to be stored and retrieved. Stored in memory 410 are, for example, computer readable instructions used by processor 405. For example, at least one of memory 410 and processor 405 may be stored by a cloud service.

Storage interface 420 is any component capable of providing processor 405 with access to database 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to database 434.

Database 434 is any computer-operated hardware suitable for storing and/or retrieving data, such as, but not limited to, data associated with database 220 (shown in FIG. 2). In some embodiments, database 434 is integrated in server system 401. For example, server system 401 may include one or more hard disk drives as database 434. In other embodiments, database 434 is external to server system 401 and may be accessed by a plurality of server computer devices 401. For example, database 434 may include a storage area network (SAN), a network attached storage (NAS) system, and/or multiple storage units such as hard disks and/or solid state disks in a redundant array of inexpensive disks (RAID) configuration.

Figure 5:
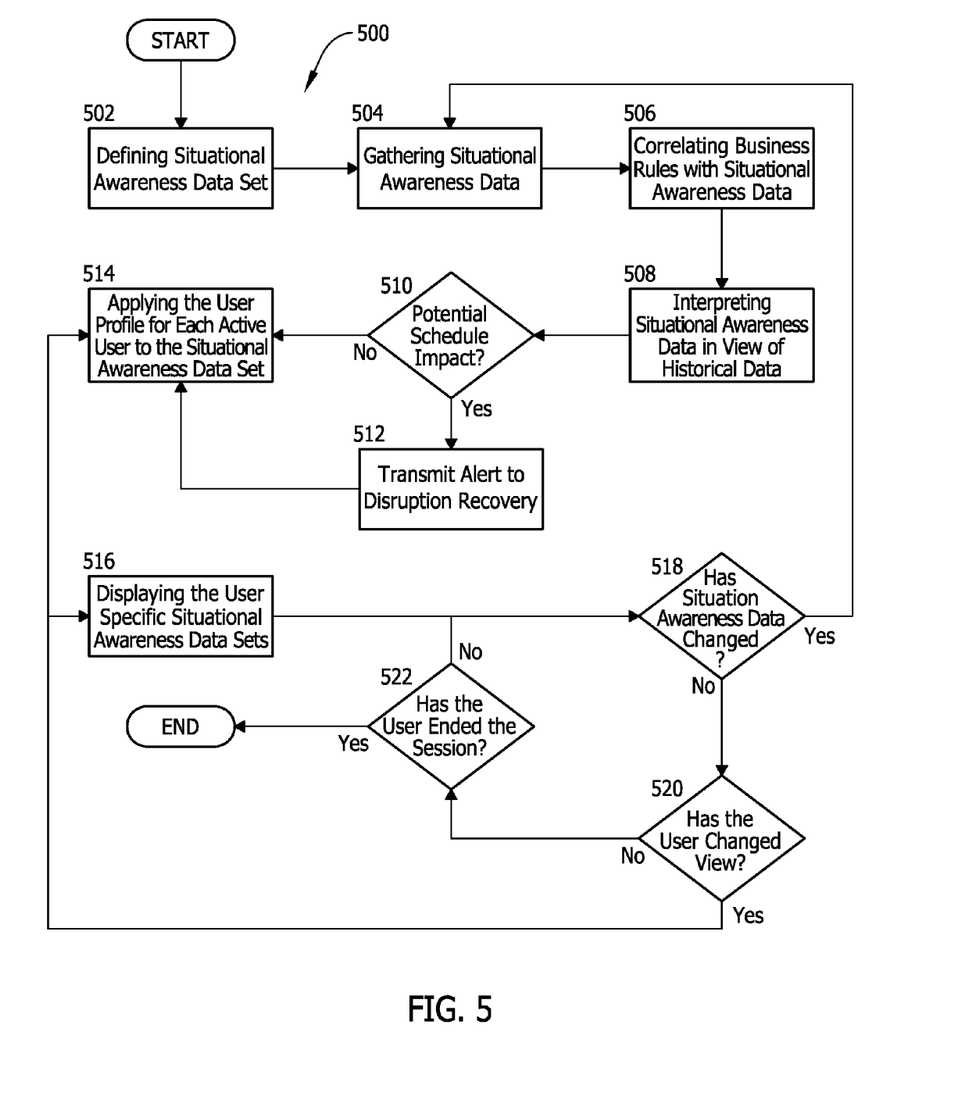
FIG. 5 is a flow chart of a method for generating and displaying integrated real-time airline operations information to provide situational awareness to a user using the user interface shown in FIG. 1 and the system shown in FIG. 2.

FIG. 5 is a flow chart of a method 500 for generating and displaying integrated real-time airline operations information to provide situational awareness to a user. Generating real-time airline operations information is performed by data sources 222, situational awareness server system 212, and database 220 (shown in FIG. 2). Users are provided situational awareness information through client system 214 (shown in FIG. 2) using user interfaces 100 (shown in FIG. 1).

In the example embodiment, the flow chart begins by defining situational awareness data set 502 by situational awareness server system 212. The situational awareness data set 502 defines what data is collected. In the example embodiment, the situational awareness data set 502 may be provided by one or more users or administrators of situational awareness server system 212 (shown in FIG. 2) and may be predefined before activation of situational awareness server system 212, changed while situational awareness server system 212 is operational, or both.

Situational awareness server system 212 gathers situational awareness data 504 from a plurality of data sources 222 (shown in FIG. 2). In the example embodiment, situational awareness server system 212 receives current data including real-time data about flights 104, aircraft 106, and airports 108 from a plurality of data sources 222. The current data may include, but is not limited to, information required for user interfaces 100 (shown in FIG. 1). Situational awareness server system 212 analyzes the received current data to generate situational awareness data based on applying the current data to the situational awareness data set.

Situational awareness server system 212 correlates the situational awareness data with one or more business rules 506. Business rules may include, but are not limited to, user-defined tasks required to be performed on aircraft 106 from landing to take-off, how many remaining hours each cabin crew member is permitted to be on duty, aircraft regulations, and airline regulations. Situational awareness server system 212 interprets the situational data in view of historical data 508 to determine any pattern matching. For example, if aircraft 106 at airport 108 takes 45 minutes to turn around (disembark passengers, service, and board passengers), and the aircraft only has 22 minutes remaining on the schedule before it is due to depart from airport 108, then this impact on schedule, i.e. disruption, raises an alert to disruption recovery.

If any alerts are raised after interpreting situational awareness information data, situational awareness server system 212 transmits an alert to disruption recovery 512. In some embodiments, situational awareness server system 212 transmits an email message to one or more users associated with disruption recovery. In other embodiments, the alert may be one or more text messages, an electronic message to a disruption recovery computer system, a pop-up notification that appears on one or more computer displays, or any other notification method that provides the functionality as described herein.

Situational awareness server system 212 applies a user profile for each active user to the situational awareness data set 514 to determine each user-specific subset of situational awareness data. Each user profile defines a user role for the associated user that includes limitations on the data that the corresponding user may access. For example, system 200 monitors multiple airlines (i.e., airline A, airline B, and airline C) where the airlines may be in competition with each other. If user A's user profile indicates that user A works for airline A, then situational awareness server system 212 filters the situational awareness to determine the sub-set of the situational awareness data that user A may access to only that data for airline A. In another example, user B is from a company that has contracted to do maintenance on aircraft 106 from airline B and airline C at a specific airport 108. The situational awareness server system 212 will determine a sub-set of the situational awareness data for user B that includes data from airline B and airline C, but only where it is applicable to that subset of aircraft under maintenance contract to the company employing user B.

Situational awareness server system 212 transmits the user-specific situational awareness information to each client system 214 which then displays the user specific subset of situational awareness data 516 on interfaces 100. In some embodiments, situational awareness server system 212 may be in control of client system 214 and controls what is displayed to the user on interfaces 100. In other embodiments, situational awareness server system 212 is in communication with client system 214 and transmits the sub-set of situational awareness data to client system 214. Client system 214 receives the sub-set of situational awareness data and displays the data to the user on interfaces 100.

Situational awareness server system 212 determines if the situational awareness data has changed 518. If the determination is that the situational awareness data has changed 518, then situational awareness server system 212 gathers situational awareness data 504. Situational awareness server system 212 continues this loop to keep the situational awareness data as up-to-date and accurate. If the determination is that the situational awareness data has not changed 518, then situational awareness server system 212 determines if the user has changed the view 520 from one of the user interfaces 100 to another user interface 100. In the example embodiment, the interface views are global view 101, area map view 110, airport view 112, aircraft view 122, and gate view 132, all shown in FIG. 1. In some embodiments, when the user changes the view, situational awareness server system 212 transmits a new sub-set of situational awareness data specific to that view to client system 214 to display. Method 500 continues cycling through the steps until situational awareness server system 212 determines that all users have logged off 522 from system 200.

Figure 6:
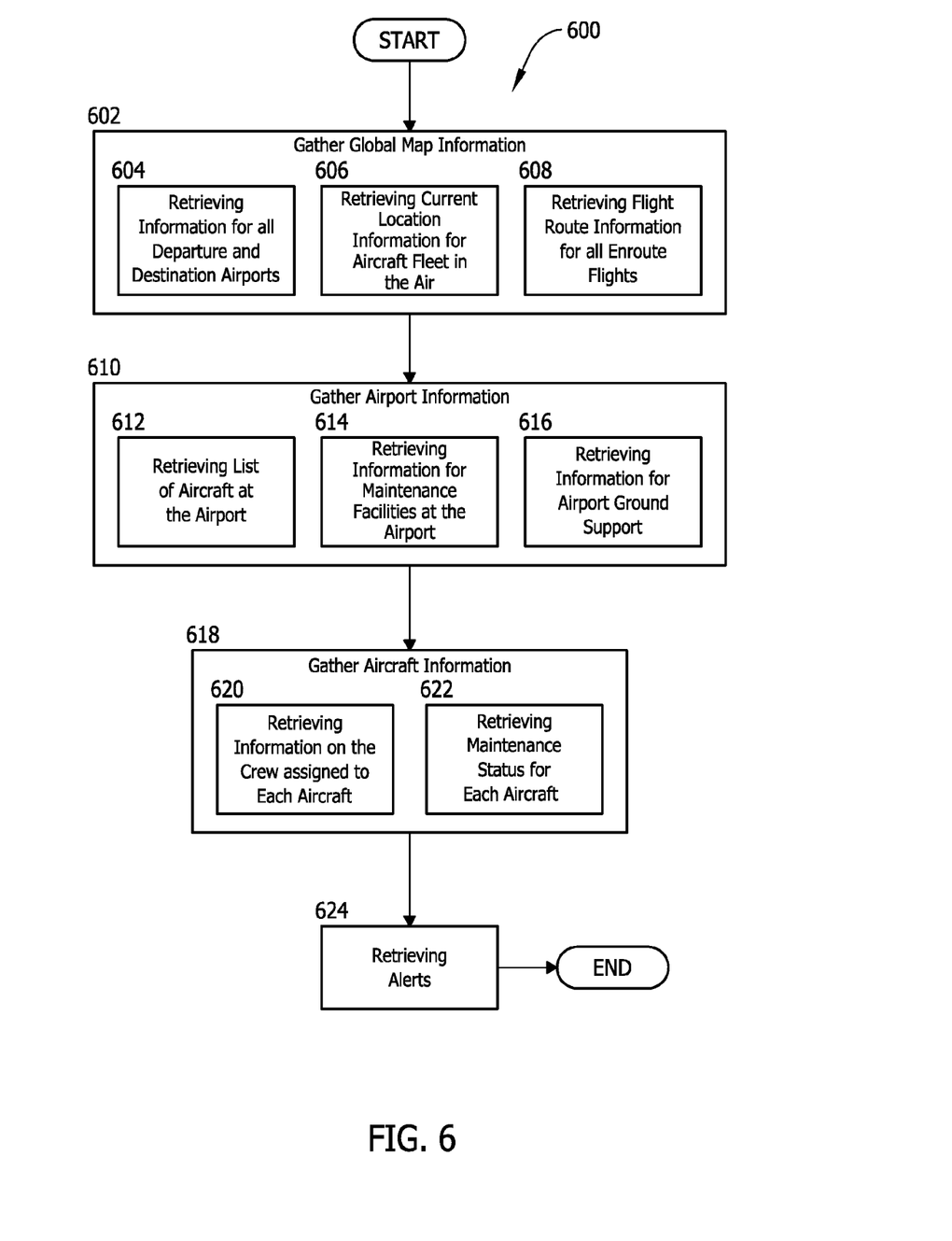
FIG. 6 is a flow chart of a process for gathering situational awareness information as is shown in FIG. 5.

FIG. 6 is a flow chart of a method 600 for gathering situational awareness information 504 as is shown in FIG. 5. Method 600 may be implemented by a computing device, for example situational awareness server system 212 (shown in FIG. 2).

In the example embodiment, situational awareness server system 212 gathers global map information 602 for global view 101 shown in FIG. 1. Situational awareness server system 212 retrieves information for all destination and departure airports 604. In some embodiments, situational awareness server system 212 requests the information from the corresponding data source 222 (shown in FIG. 2). In other embodiments, situational awareness server system 212 automatically receives the information from data source 222 on a regular and recurring basis. Situational awareness server system 212 retrieves current location information for aircraft currently in the air 606. Situational awareness server system 212 retrieves flight route information for all enroute flights 608.

Situational awareness server system 212 gathers airport information 610 for airport view 112 and gate view 132 (both shown in FIG. 1). Situational awareness server system 212 retrieves a list of aircraft at each airport 612. Situational awareness server system 212 retrieves information about maintenance facilities at each airport 614. Situational awareness server system 212 retrieves information about ground support at each airport 616.

Situational awareness server system 212 gathers aircraft information for 618 aircraft view 122 (shown in FIG. 1). Situational awareness server system 212 retrieves information about the crew assigned to each aircraft 620. Situational awareness server system 212 retrieves maintenance information for each aircraft 622. Additionally, situational awareness server system 212 retrieves the active alerts 624, for example alerts that were determined 510 and transmitted 512 as shown in FIG. 5.

Figure 7:
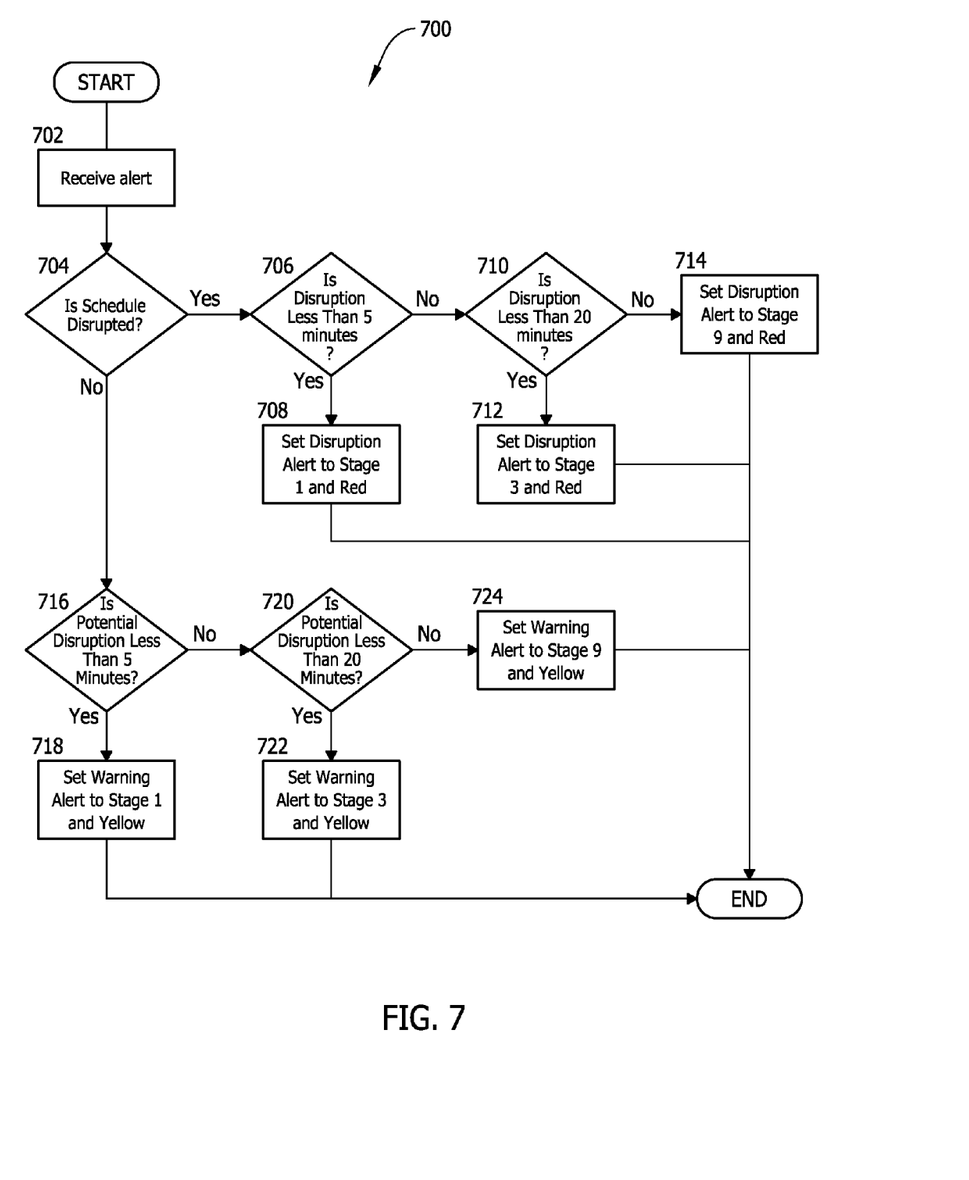
FIG. 7 is a flow chart of a process for categorizing alerts created by interpreting situational awareness data in view of historical data as is shown in FIG. 5.

FIG. 7 is a flow chart of a process 700 for categorizing alerts created by interpreting situational awareness data in view of historical data 508 as shown in FIG. 5. Process 700 may be implemented by a computing device, for example situational awareness server system 212 (shown in FIG. 2).

In the example embodiment, situational awareness server system 212 receives an alert 702 and determines if the schedule is disrupted 704. If the determination is that the schedule is disrupted 702, then situational awareness server system 212 determines if the disruption is less than five minutes 706. If the disruption is less than five minutes then situational awareness server system 212 sets a disruption alert to Stage 1 and to the color red 708. The Stage represents the severity of the disruption and the color represents whether the schedule is currently disrupted (Red) or potentially disrupted (Yellow). If the disruption is not less than five minutes 706, situational awareness server system 212 determines if the disruption is less than twenty minutes 710. If the disruption is less than twenty minutes 710, situational awareness server system 212 sets the disruption alert to Stage 3 and Red 712. If the disruption is not less than twenty minutes 710, situational awareness server system 212 sets the disruption alert to Stage 9 and Red 714.

If the determination is that the schedule is not disrupted 704, situational awareness server system 212 determines if the potential disruption is within five minutes 716. If the potential disruption is within five minutes, situational awareness server system 212 sets the disruption alert to Stage 1 and to the color yellow 718. If the potential disruption is not within five minutes 716, situational awareness server system 212 determines if the potential disruption is within twenty minutes 720. If the potential disruption is within twenty minutes, situational awareness server system sets the disruption alert to Stage 3 and Yellow 722. If the potential disruption is not within twenty minutes 720, situational awareness server system 212 sets the disruption alert to Stage 9 and Yellow 724.

FIG. 8 is a flow chart of a process 800 for displaying the user specific subset of situational awareness data 516 (shown in FIG. 5). Process 800 may be implemented by a computing device, for example client system 214 (shown in FIG. 2). In some embodiments, situational awareness server system transmits a user specific subset of situational awareness data to the user's client system 214 when it changes and client system 214 parses the subset of situational awareness data to display the view that the user selects. In other embodiments, situational awareness server system 212 receives a selection of a view which the user desires to view and transmits the subset of situational awareness data associated with that selected view to client system 214 to display for user. In either case, client system 214 displays situational awareness information from situational awareness server system 212 using interfaces 100 (shown on FIG. 1).

In an example embodiment, situational awareness server system 212 determines if the user is viewing global view 802 corresponding to global view 101 (shown in FIG. 1). If the user is viewing global view 802, situational awareness server system 212 displays the global map 804, overlays the user-specific global situational awareness information 806 and overlays 808 any user-specific alerts. The user views the overlay information on global view 101 and can decide what action to take including switching to another view to drill down for further information by selecting an aircraft 106, airport 108, or map area 103 visible in the global view 101. If the user is viewing area map view 810 corresponding to area map view 110 (shown in FIG. 1), situational awareness server system 212 displays the user-selected map area 812, overlays the user-specific area situational awareness information 814 and overlays any user-specific alerts for map area 816. The user views the overlay information on area map view 110 and can decide what action to take including switching to another view to drill down for further information by selecting an aircraft 106 or airport 108 visible in the overlay information. Situational awareness server system 212 determines if the user is viewing airport view 818 corresponding to airport view 112 (shown in FIG. 1). If the user is viewing airport view 818, situational awareness server system 212 displays 820 the airport map for the selected airport 108 (shown in FIG. 1), overlays the user-specific airport situational awareness information 822 and overlays any user-specific schedule disruption alerts for that airport 824. The user views the overlay information on airport view 112 and can decide what action to take including expanding any information in that view or switching to another view to drill down for further information by selecting an aircraft 106 or airport 108 visible in the overlay information. Situational awareness server system 212 determines if the user is viewing airport gate view 826 corresponding to gate view 132 (shown in FIG. 1). If the user is viewing gate view 826, situational awareness server system 212 displays a map or image of the selected gate 828, overlays the user-specific gate situational awareness information 830 and overlays any user-specific schedule disruption alerts for that gate 832. The user views the overlay information on gate view 132 and can decide what action to take including expanding any information in that view or switching to another view to drill down for further information by selecting an aircraft 106 visible in the overlay information. Situational awareness server system 212 determines if the user is viewing aircraft view 834 corresponding to aircraft view 122 (shown in FIG. 1). If the user is viewing aircraft view 834, situational awareness server system 212 displays image of aircraft 836, overlays the user-specific aircraft situational awareness information 838 and overlays any user-specific schedule disruption alerts for that aircraft 840. The user views the overlay information on aircraft view 122 and can decide what action to take including expanding any information in that view.

In another example embodiment, client system 214 determines if the user is viewing global view 802 corresponding to global view 101 (shown in FIG. 1). If the user is viewing global view 802, client system 214 displays the global map 804, overlays the user-specific global situational awareness information 806 and overlays 808 any user-specific alerts. If the user is viewing area map view 810 corresponding to area map view 110 (shown in FIG. 1), client system 214 displays the user-selected map area 812, overlays the user-specific area situational awareness information 814 and overlays any user-specific alerts for map area 816. Situational awareness server system 212 determines if the user is viewing airport view 818 corresponding to airport view 112 (shown in FIG. 1). If the user is viewing airport view 818, client system 214 displays 820 the airport map for the selected airport 108 (shown in FIG. 1), overlays the user-specific airport situational awareness information 822 and overlays any user-specific schedule disruption alerts for that airport 824. Situational awareness server system 212 determines if the user is viewing airport gate view 826 corresponding to gate view 132 (shown in FIG. 1). If the user is viewing gate view 826, client system 214 displays a map or image of the selected gate 828, overlays the user-specific gate situational awareness information 830 and overlays any user-specific schedule disruption alerts for that gate 832. Situational awareness server system 212 determines if the user is viewing aircraft view 834 corresponding to aircraft view 122 (shown in FIG. 1). If the user is viewing aircraft view 834, client system 214 displays image of aircraft 836, overlays the user-specific aircraft situational awareness information 838 and overlays any user-specific schedule disruption alerts for that aircraft 840.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The implementations described herein relate to systems and methods for providing situational awareness of airline operations. More specifically, a situational awareness server system receives real-time data about flights, airports and aircraft from a plurality of data sources. The situational awareness server system collates real-time data to generate a complete picture of the airline as situational awareness data. The situational awareness server system correlates the situational awareness data with business rules and historical data to determine if there are any actual or potential schedule impacts. If the situational awareness server system detects a potential schedule impacts, the situational awareness server system transmits an alert to disruption recovery. The situational awareness server system filters the situational awareness data based on the user viewing the data so that the right data is shown to the right person. The situational awareness server system displays the situational awareness data to the user in a plurality of views that allow the user to look at a global view of airline operations all of the way down to looking at individual gates and aircraft. As such, this overview combined with drill down capability allows the user to efficiently access data to maintain or reestablish normal operation.

This written description uses examples to disclose various implementations, including the best mode, and also to enable any person skilled in the art to practice the various implementations, including making and using any devices or systems and performing any incorporated methods. Other examples may occur to those skilled in the art. Such other examples are intended to be within the scope of the claims if they have structural elements that do not differ from the literal language of the claims, or if they include equivalent structural elements with insubstantial differences from the literal language of the claims. The patentable scope of the disclosure is defined by the claims.

What is claimed is:

1. A computer-implemented method for providing a real-time global view of airline operations situational awareness, the method implemented using a situational awareness server system in communication with client systems and data sources, the method comprising:
    gathering, from a plurality of data sources, a plurality of situational awareness data including substantially real-time data about flights, aircraft, and airports;
    updating, by the situational awareness server system, the situational awareness data based on one or more business rules;
    augmenting, by the situational awareness server system, the updated situational awareness data based on historical data;
    transmitting, to a plurality of users, a plurality of views based on the updated situational awareness data, wherein a subset of the plurality of views includes map data, wherein the plurality of views includes an airport view including an airport map and a gate view including an airport gate map, wherein each of the plurality of users is associated with a user role, and wherein the plurality of views transmitted to each user corresponds to the associated user role;
    determining whether to generate one or more alerts based on the augmented situational awareness data, wherein the alerts are based on a schedule disruption; and
    transmitting the one or more alerts to a disruption recovery computer device.

2. A method in accordance with claim 1, further comprising:
    receiving, from a client system, a user profile including the user role associated with the user;
    determining a subset of the updated situational awareness data associated with the user profile based on the user role; and
    transmitting, to the client system, the determined subset of the updated situational awareness data, wherein the client system displays the subset of the updated situational awareness data to the user.

3. A method in accordance with claim 2, wherein determining a subset of the updated situational awareness data further comprises:
    receiving, from the client system, a user selected view; and
    determining the subset of updated situational awareness data based on the user selected view.

4. A method in accordance with claim 2, wherein transmitting, to the client system, the determined subset of the updated situational awareness data further comprises organizing the situational awareness data into a plurality of views.

5. A method in accordance with claim 4, wherein the plurality of views includes a global map view, an area map view, a view for each airport, a view for each aircraft, and a view for each airport gate.

6. A method in accordance with claim 2, wherein each view includes an area based on the selected view, a first overlay associated with the user role, and a second overlay including alerts associated with the user role.

7. A method in accordance with claim 1, wherein gathering situational awareness data from a plurality of data sources further comprises:
receiving, from a plurality of data sources, a plurality of current data including real-time data about flights, aircraft and airports; and
generating the situational awareness data based on the plurality of current data and a user defined data set.

8. A method in accordance with claim 1, wherein the one or more business rules includes at least one of user-defined rules for events, conditions and actions.

9. A method in accordance with claim 1, wherein augmenting the situational awareness data based on historical data further comprises interpreting current and historical data to determine changes in trends.

10. A method in accordance with claim 1, wherein interpreting alerts based on current and historical data further comprises:
determining if the alert is an actual schedule disruption type or potential disruption type; and
determining the stage of the alert.

11. A method in accordance with claim 10, wherein determining a stage of the alert further comprises:
determine a delay time associated with the alert, wherein the delay time represents an amount of delay associated with a disruption associated with the alert;
if the alert is an actual schedule disruption type, the method further comprises:
if the delay time does not exceed a first threshold, set the alert to a first alert level;
if the delay time exceeds the first threshold but not a second threshold, set the alert to a second alert level; and
if the delay time exceeds the first threshold and the second threshold, set the alert to a third alert level; and
if the alert is a potential disruption type, the method further comprises:
if the delay time does not exceed a first threshold, set the alert to a first warning level;
if the delay time exceeds the first threshold but not a second threshold, set the alert to a second warning level; and
if the delay time exceeds the first threshold and the second threshold, set the alert to a third warning level.

12. A situational awareness system used to provide a real-time global view of airline operations, said situational awareness server system comprising a processor coupled to a memory device, said processor programmed to:
gather a plurality of situational awareness data from a plurality of data sources including real-time data about flights, aircraft, and airports;
update the situational awareness data based on one or more business rules;
augment the updated situational awareness data based on historical data;
transmit, to a plurality of users, a plurality of views based on the updated situational awareness data, wherein a subset of the plurality of views includes map data, wherein the plurality of views includes an airport view including an airport map and a gate view including an airport gate map, wherein each of the plurality of users is associated with a user role, and wherein the plurality of views transmitted to each user corresponds to the associated user role;
determine whether to generate one or more alerts based on the augmented situational awareness data, wherein the alerts are based on a schedule disruption; and
transmit the one or more alerts to a disruption recovery computer device.

13. The situational awareness server system of claim 12, wherein the at least one processor is further programmed to:
receive a user profile including the user role associated with the user from a client system;
determine a subset of the updated situational awareness data associated with the user profile based on the user role; and
transmit the determined subset of the updated situational awareness data to the client system, wherein the client system displays the subset of the updated situational awareness data to the user.

14. The situational awareness server system of claim 12, wherein the at least one processor is further programmed to:
receive periodic updates;
receive updates whenever data changes in real-time; and
request updated information.

15. The situational awareness server system of claim 12, wherein the at least one processor is further programmed to:
receive a plurality of current data from a plurality of data sources including real-time data about flights, aircraft and airports; and
generate the situational awareness data based on the plurality of current data and a user defined data set.

16. The situational awareness server system of claim 12, wherein the one or more business rules includes at least one of user-defined rules for events, conditions and actions.

17. The situational awareness server system of claim 12, wherein the at least one processor is further programmed to interpret current and historical data to determine changes in trends.

18. The situational awareness server system of claim 12, wherein the at least one processor is further programmed to:
interpret alerts based on current and historical data;
determine if the alert is an actual schedule disruption type or potential disruption type; and
determine the stage of the alert.

19. A non-transitory computer-readable storage media having computer-executable instructions embodied thereon, wherein when executed by at least one processor, the computer-executable instructions cause the at least one processor to:
gather a plurality of situational awareness data from a plurality of data sources including real-time data about flights, aircraft, and airports;
update the situational awareness data based on one or more business rules;
augment the situational awareness data based on historical data;
transmit, to a plurality of users, a plurality of views based on the updated situational awareness data, wherein a subset of the plurality of views includes map data, wherein the plurality of views includes an airport view including an airport map and a gate view including an airport gate map, wherein each of the plurality of users is associated with a user role, and wherein the plurality of views transmitted to each user corresponds to the associated user role;
interpret alerts based on current and historical data;
receive a user profile including a user role associated with a user from a client system;

determine a subset of the updated situational awareness data associated with the user profile based on the user role; and transmit the determined subset of the updated situational awareness data to the client system, wherein the client system displays the subset of the updated situational awareness data to the user.

20. The computer-readable storage media of claim 19, wherein the computer-executable instructions further cause the at least one processor to:

receive a plurality of current data from a plurality of data sources including real-time data about flights, aircraft and airports;

generate the situational awareness data based on the plurality current data and a user defined data set;

interpret current and historical data to determine changes in trends;

determine if the alert is an actual schedule disruption type or potential disruption type;

determine the stage of the alert;

receive a user selected view from the client system;

determine the subset of updated situational awareness data based on the user selected view; and organize the situational awareness data into a plurality of views.

* * * * *